(12) United States Patent
Sato

(10) Patent No.: US 9,025,200 B2
(45) Date of Patent: May 5, 2015

(54) INFORMATION PROCESSING APPARATUS, INFORMATION PROCESSING METHOD, AND STORAGE MEDIUM FOR CORRECTING COLORS IN AN IMAGE OUTPUT

(71) Applicant: Canon Kabushiki Kaisha, Tokyo (JP)

(72) Inventor: Hideo Sato, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/916,490

(22) Filed: Jun. 12, 2013

(65) Prior Publication Data

US 2013/0342861 A1    Dec. 26, 2013

(30) Foreign Application Priority Data

Jun. 26, 2012  (JP) ................... 2012-143138

(51) Int. Cl.
  *G06F 15/00*  (2006.01)
  *G06K 1/00*  (2006.01)
  *H04N 1/60*  (2006.01)
  *H04N 1/46*  (2006.01)
  *G06K 15/02*  (2006.01)

(52) U.S. Cl.
  CPC ............. *H04N 1/46* (2013.01); *G06K 15/1878* (2013.01); *H04N 1/6033* (2013.01); *H04N 1/6097* (2013.01); *G06K 15/1868* (2013.01)

(58) Field of Classification Search
  None
  See application file for complete search history.

(56) References Cited

U.S. PATENT DOCUMENTS

| 6,160,968 A * | 12/2000 | Noda ................................ 399/8 |
| 2006/0119879 A1* | 6/2006 | Nakai et al. .................. 358/1.14 |
| 2010/0214601 A1* | 8/2010 | Narita ........................... 358/1.15 |
| 2012/0206745 A1* | 8/2012 | Shibuya ......................... 358/1.9 |

FOREIGN PATENT DOCUMENTS

| JP | 2011-43815 A | 3/2011 |
| JP | 2011-254350 A | 12/2011 |

\* cited by examiner

*Primary Examiner* — Vincent Rudolph
*Assistant Examiner* — Michael Burleson
(74) *Attorney, Agent, or Firm* — Canon USA, Inc., IP Division

(57) ABSTRACT

An information processing apparatus connectable to an image processing apparatus that performs printing using a sheet stored in a paper feed stage and classified as a paper type on which a calibration table has been generated, includes an a receiving unit configured to receive an instruction to perform printing, and a notification unit configured to refer to information on the paper feed stage acquired, and notify, in a case where the sheet classified as a paper type on which the calibration table has been generated is not stored in a first paper feed stage instructed to be used for printing when the receiving unit has received an instruction to perform printing, of a second paper feed stage that stores a different type of sheet from the type of sheet stored in the first paper feed stage.

12 Claims, 21 Drawing Sheets

FIG.9

<PAPER FEED STAGE DETAILED INFORMATION>

| PAPER FEED STAGE | CORRECTION PERFORMED | TARGET VALUE | SHEET TYPE |
|---|---|---|---|
| CASSETTE 1 | ○ | ○ | A4 PLAIN PAPER 1 (64~81 g/m$^2$) |
| CASSETTE 2 |  | ○ | A4 PLAIN PAPER 2 (82~105 g/m$^2$) |
| CASSETTE 3 |  |  | A4 THIN PAPER (52~63 g/m$^2$) |
| CASSETTE 4 |  |  | A3 THIN PAPER (52~63 g/m$^2$) |
| PAPER DECK | ○ | ○ | A4 PLAIN PAPER 1 (64~81 g/m$^2$) |

TARGET VALUE REGISTERED SHEET LIST

Figure 10:
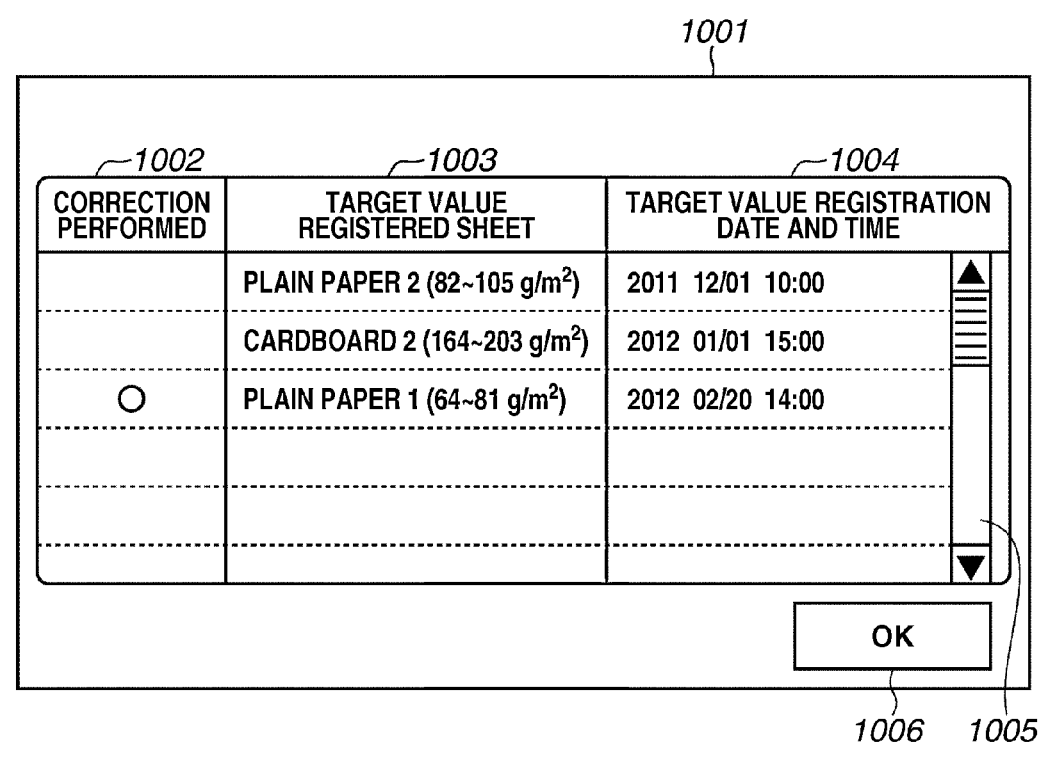

| CORRECTION PERFORMED | TARGET VALUE REGISTERED SHEET | TARGET VALUE REGISTRATION DATE AND TIME |
|---|---|---|
|  | PLAIN PAPER 2 (82~105 g/m$^2$) | 2011 12/01 10:00 |
|  | CARDBOARD 2 (164~203 g/m$^2$) | 2012 01/01 15:00 |
| ○ | PLAIN PAPER 1 (64~81 g/m$^2$) | 2012 02/20 14:00 |
|  |  |  |
|  |  |  |

NONE OF THE PAPER FEED STAGES STORE
THE SHEET USED IN PERFORMING CALIBRATION.

| CANCEL | CONTINUE PRINTING |

<PAPER FEED STAGE DETAILED INFORMATION>

| PAPER FEED STAGE | CORRECTION DATE AND TIME | TARGET VALUE | CORRECTION VALID PERIOD | SHEET TYPE |
|---|---|---|---|---|
| CASSETTE 1 | ○ 2012/02/20 | ○ | OK | A4 PLAIN PAPER 1 (64~81 g/m²) |
| CASSETTE 2 | | ○ | | A4 PLAIN PAPER 2 (82~105 g/m²) |
| CASSETTE 3 | | | | A4 THIN PAPER (52~63 g/m²) |
| CASSETTE 4 | ○ 2012/02/20 | ○ | | A3 THIN PAPER (52~63 g/m²) |
| PAPER DECK | | | OK | A4 PLAIN PAPER 1 (64~81 g/m²) |

TARGET VALUE REGISTERED SHEET LIST

OK

INFORMATION PROCESSING APPARATUS, INFORMATION PROCESSING METHOD, AND STORAGE MEDIUM FOR CORRECTING COLORS IN AN IMAGE OUTPUT

BACKGROUND OF THE INVENTION

1. Field of the Invention

The present invention relates to an information processing apparatus connected to an image processing apparatus that corrects colors in an image output from a printer, an information processing method, and a storage medium.

2. Description of the Related Art

Recently, devices that realize the same level of image quality as printing devices have appeared along with improvements in the performance of electrophotographic image processing apparatuses (hereinafter referred to as image processing apparatuses). However, fluctuations in density and color are greater in such devices as compared to the printing devices due to instability unique to the electrophotographic method.

To solve such a problem, the conventional image processing apparatus includes a single color calibration technique. The single calibration technique generates a look up table (LUT) for correcting one-dimensional gradation characteristics corresponding to each of cyan, magenta, yellow, and black (C, M, Y, and K) toners. The LUT is a table indicating output data corresponding to input data segmented at specific intervals, capable of expressing a non-linear characteristic that cannot be expressed by an arithmetic expression.

A one-dimensional LUT for correcting the density is a table indicating output signal values corresponding to each of C, M, Y, and K input signal values, and the image processing apparatus forms the image on a sheet of paper using amounts of toner according to the output signals.

When the image processing apparatus generates the one-dimensional LUT, a chart configured by patches of data having different gradations corresponding to each of the C, M, Y, and K toners is provided. The chart is output from the image processing apparatus.

The chart is then measured using a sensor or a scanner arranged in the image processing apparatus, or a color measurement device (i.e., a colorimeter) other than the image processing apparatus. The measured value is compared with preset target data, so that the one-dimensional LUT (1D-LUT) for correcting each of the C, M, Y, and K colors independently is generated. The "single color" indicates a color expressed using a single toner, i.e., C, M, Y, or K.

Further, in recent years, there is a technique for performing calibration of mixed colors using a four-dimensional LUT (4D-LUT) (refer to Japanese Patent Application Laid-Open No. 2011-254350). The mixed color indicate red, green, blue, or a color formed using a plurality of toners, such as gray formed using C, M and Y toners. The 4D-LUT converts a combination of the signal values for outputting each of the C, M, Y, and K toners to a different combination of the C, M, Y, and K signal values.

A non-linear difference often occurs with respect to the mixed color in the image processing apparatus even when the gradation characteristics of a single color is corrected using the 1D-LUT. The mixed colors, i.e., colors formed using a plurality of toners, can thus be corrected employing the 4D-LUT.

The process for performing calibration in the case where the mixed color is included will be described below. A patch is output to a recording medium such as a sheet, employing the chart data used in single color calibration, for performing the single color calibration. The patch is then read by the scanner or the sensor. The data acquired by reading the patch is compared with a preset target value, and the 1D-LUT for correcting the difference from the target value is generated. A patch is then output to the recording medium employing mixed color chart data converted by the previously generated 1D-LUT, for performing the mixed color calibration. The patch is then read by the scanner or the sensor. The data acquired by reading the patch is compared with the preset target value, and the 4D-LUT for correcting the difference from the target value is generated.

As described above, the mixed color characteristics that cannot be corrected by only performing the single color calibration can be corrected with high accuracy by performing the mixed color calibration.

Furthermore, recent image processing apparatuses include a plurality of paper feed stages for storing the sheets to be printed on. Each of the paper feed stages store various types of sheets having different grammage, size, surface texture, and chromaticity, for generating printed products having various values. In particular, the grammage and the surface texture of the sheet and the chromaticity the sheet itself are closely related to the gradation characteristics and reproduction of the mixed color characteristics to be corrected by performing calibration. It is thus important that each LUT and the paper type are associated with each other to assure that the image quality is appropriately corrected. In other words, the paper type and the target value of the calibration are associated with each other, and the target value changes along with the paper type. More specifically, if the grammage and the surface texture of the sheet and the chromaticity the sheet itself are different, the density and the mixed color become different even when the same toners are fixed on the sheet.

To solve such a problem, Japanese Patent Application Laid-Open No. 2011-43815 discusses a technique for indicating, when performing calibration, the paper feed stage storing the sheet to be used in performing calibration.

However, according to Japanese Patent Application Laid-Open No. 2011-43815, the paper feed stage storing the sheet used when performing the appropriate single color calibration or the mixed color calibration cannot be confirmed after performing calibration or when performing printing. As a result, the image processing apparatus may perform printing using a sheet on which an appropriate calibration table has not been generated, even when the image processing apparatus has generated the appropriate calibration table for another sheet. In such a case, the printed product in which the gradation characteristics and the mixed color characteristics are inappropriate is output.

SUMMARY OF THE INVENTION

According to an aspect of the present invention, an information processing apparatus connectable to an image processing apparatus that performs printing using a sheet stored in a paper feed stage and classified as a paper type on which a calibration table has been generated, includes an acquisition unit configured to acquire from the image processing apparatus, information on a type of sheet used when performing calibration and the paper feed stage, a receiving unit configured to receive an instruction to perform printing, and a notification unit configured to refer to the information on the paper feed stage acquired by the acquisition unit, and notify, in a case where the sheet classified as the paper type on which the calibration table has been generated is not stored in a first paper feed stage instructed to be used for printing when the receiving unit has received an instruction to perform printing, of a second paper feed stage that stores a different type of sheet from the type of sheet stored in the first paper feed stage.

According to another aspect of the present invention, an image processing apparatus that performs printing using a sheet stored in a paper feed stage and classified as a paper type on which a calibration table has been generated, includes a storing unit configured to store as information for determining, in a case where a calibration table is generated, a paper feed stage storing the sheet classified as the paper type on which the calibration table has been generated in a connected information processing apparatus, the paper type of the sheet used when generating the calibration table, the paper feed stage storing the sheet classified as the paper type, a target value used when generating the calibration table, and information on time at which the calibration table has been generated.

According to the present invention, the paper feed stage storing the sheet on which the calibration table has been generated can be easily confirmed when performing printing. Further, since printing can then be performed using the sheet on which the calibration table has been generated, a printed product which has been appropriately corrected can be output.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 illustrates an example of a paper feed stage detailed information screen.

FIG. 10 illustrates an example of a target value registered sheet list screen.

FIG. 15 illustrates an example of a screen notifying that the sheet used in performing calibration cannot be selected.

FIG. 17 illustrates an example of a paper feed stage detailed information screen according to the second exemplary embodiment.

DESCRIPTION OF THE EMBODIMENTS

Various exemplary embodiments, features, and aspects of the invention will be described in detail below with reference to the drawings.

Figure 1:
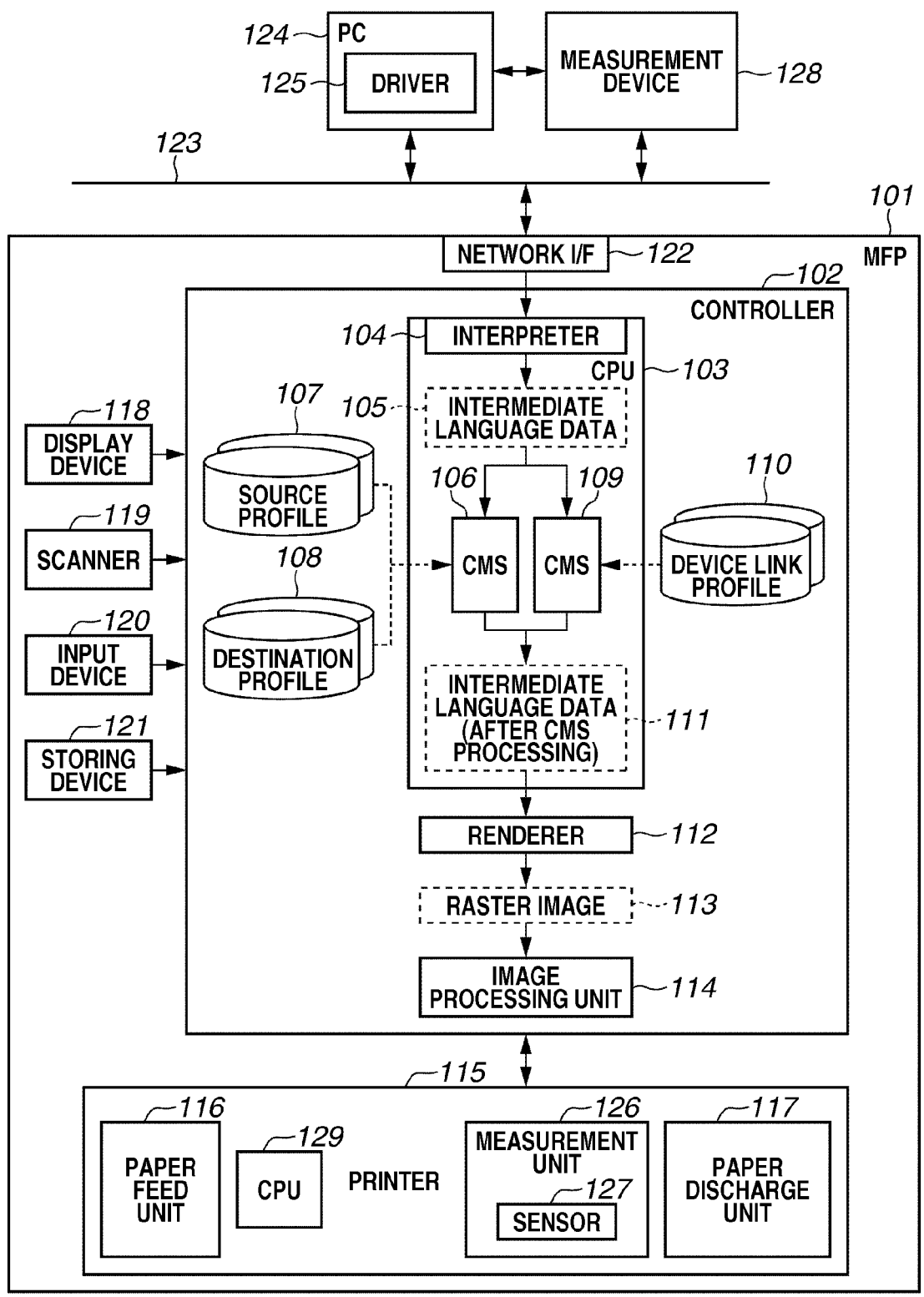
FIG. 1 illustrates a system configuration.

FIG. 1 illustrates a configuration of a system according to the present exemplary embodiment. Referring to FIG. 1, a multifunction peripheral (MFP) 101 which is an image processing apparatus using each of the C, M, Y, and K toners is connected to other network-compatible devices via a network 123. Further, a printer driver 125 in a PC 124 connected to the MFP 101 via the network 123 transmits print data to the MFP 101.

The MFP 101 will be described in detail below. A network interface (I/F) 122 receives the print data. A controller 102 includes a central processing unit (CPU) 103, a renderer 112, and an image processing unit 114. An interpreter 104 in the CPU 103 interprets a page description language (PDL) portion of the received print data, and generates intermediate language data 105.

A color management system (CMS) 106 performs color conversion using a source profile 107 and a destination profile 108, and generates intermediate language data (after performing CMS processing) 111. The CMS performs color conversion using information on the profile to be described below. The source profile 107 is a profile for converting a device-dependent color space such as an RGB or a CMYK color space to a device-independent color space such as a L*a*b* (hereinafter referred to as Lab) color space defined by International Commission on Illumination (CIE) or an XYZ color space. The XYZ color space is a device-independent color space similarly as Lab, and expresses color employing tristimulus values. Further, the destination profile 108 is a profile for converting the device-independent color space to the CMYK color space which depends on a device (i.e., a printer 115).

On the other hand, the CMS 109 performs color conversion using a device link profile 110 and generates the intermediate language data (after performing CMS processing) 111. The device link profile 110 is a profile for directly converting the device-dependent color space such as the RGB or the CMYK color space to the CMYK color space which depends on the device (i.e., the printer 115). The selection of either the CMS 106 or the CMS 109 depends on a setting of the printer driver 125.

According to the present exemplary embodiment, the CMS (106 or 109) is specified according to the type of the profile (107, 108, or 110). However, one CMS may deal with a plurality of types of profile. Further, the types of profile are not limited to the examples described according to the present exemplary embodiment, and there can be any type of profile as long as the profile uses the device-dependent CMYK color space of the printer 115.

The renderer 112 generates a raster image 113 from the intermediate language data (after performing CMS processing) 111. The image processing unit 114 performs image processing on the raster image 113 or an image read by a scanner 119. The image processing unit 114 will be described in detail below.

The printer 115 connected to the controller 102 forms the output data on the sheet using the color toners, i.e., C, M, Y, and K. The printer 115 includes a paper feed unit 116 that feeds the sheets, a paper discharge unit 117 that discharges the sheet on which the output data is formed, and a measurement unit 126.

The measurement unit 126 includes a sensor 127 capable of acquiring spectral reflectivity and values of the device-independent color space such as Lab and XYZ, and is controlled by a CPU 129 that controls the printer 115. The measurement unit 126 reads using the sensor 127 the patch output from the printer 115 to the recording medium such as the sheet, and transmits the read numerical value information to the controller 102. The controller 102 employs the numerical value information and performs calculation, and uses the calculation result when performing the single color calibration or the mixed color calibration.

A display device 118 is a user interface (UI) that displays to a user an instruction or a state of the MFP 101. The display device 118 is used for performing the single color calibration or the mixed color calibration to be described below.

The scanner 119 includes an auto document feeder. The scanner 119 irradiates a bundle of document images or a sheet of a document image with light from a light source (not illustrated). The scanner 119 then forms via a lens a reflected image of the document on a solid state image sensor such as a charge coupled device (CCD) sensor. The scanner 119 thus acquires as the image data, a raster image reading signal from the solid state image sensor.

An input device 120 is an interface for receiving input from the user. A portion of the input device 120 may be configured as a touch panel and integrated with the display device 118.

A storing device 121 stores the data processed or received by the controller 102.

A measurement device 128 is an external measurement device connected to the network or the PC 124, and is capable of acquiring the spectral reflectivity and the values of the device-independent color space such as Lab and XYZ, similarly as the measurement unit 126.

Figure 2:
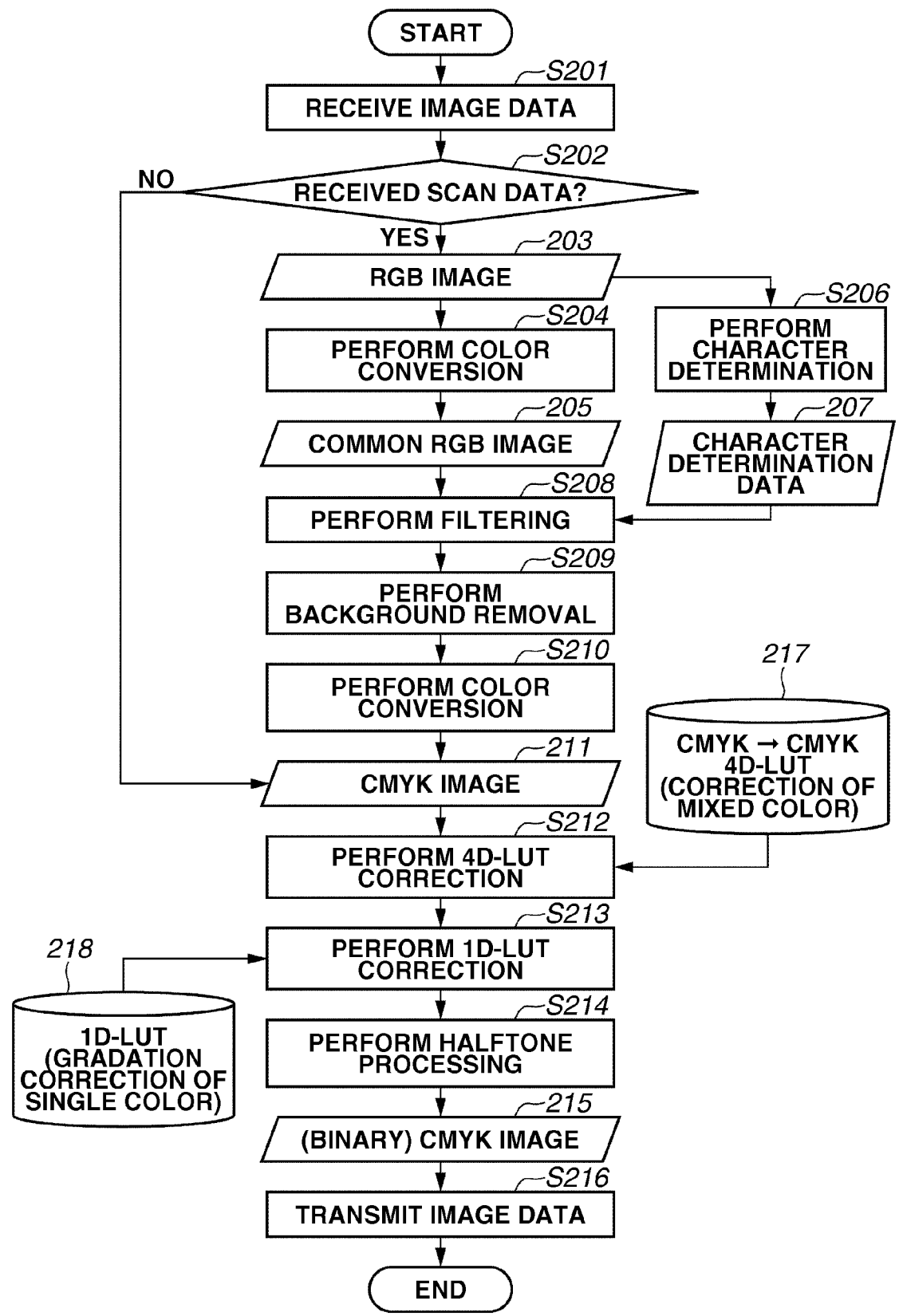
FIG. 2 is a flowchart illustrating image processing.

The flow of the process performed by the image processing unit 114 will be described below with reference to FIG. 2. FIG. 2 is a flowchart illustrating image processing performed on the raster image 113 or the image read by the scanner 119. The process illustrated in FIG. 2 is realized by an application specific integrated circuit (ASIC) (not illustrated) in the image processing unit 114 executing the process.

In step S201, the image processing unit 114 receives image data. In step S202, the image processing unit 114 determines whether the received data is scan data received from the scanner 119 or the raster image 113 received from the printer driver 125.

If the received data is not the scan data (NO in step S202), the received data is the raster image 113 which has been rendered into bitmap data by the renderer 112. The CMS thus converts the data into the CMYK color space that is dependent on the printer device, and a CMYK image 211 is acquired.

If the received data is the scan data (YES in step S202), the received data is an RGB image 203. In step S204, the image processing unit 114 thus performs color conversion on the RGB image 203 and generates a common RGB image 205. The common RGB image 205 is defined in a device-independent RGB color space, and can be converted to a device-independent color space such as Lab by performing calculation.

In step S206, the image processing unit 114 performs character determination, and generates character determination data 207. According to the present exemplary embodiment, the image processing unit 114 detects edges in the image and generates the character determination data 207.

In step S208, the image processing unit 114 performs filtering on the common RGB image 205 using the character determination data 207. The image processing unit 114 performs using the character determination data 207, different types of filtering on the character portion and on the rest of the image.

In step S209, the image processing unit 114 performs background removal processing. In step S210, the image processing unit 114 performs color conversion, and thus generates the CMYK image 211 in which the background has been removed.

In step S212, the image processing unit 113 performs mixed color correction using a 4D-LUT 217. The 4D-LUT is the four-dimensional LUT that converts a combination of the signal values when outputting each of the C, M, Y, and K toners to a different combination of the C, M, Y, and K signal values. The 4D-LUT 217 is generated by performing mixed color calibration to be described below. The mixed color which uses a plurality of toners can be corrected employing the 4D-LUT.

Upon correcting the mixed colors in step S212, the processing proceeds to step S213. In step S213, the image processing unit 114 corrects the gradation characteristics of each single color of the C, M, Y, and K colors employing a 1D-LUT 218. The 1D-LUT is the one-dimensional LUT that corrects each of the C, M, Y, and K colors (i.e., the single colors). The 1D-LUT 218 is generated by performing single color calibration to be described below.

In step S214, the image processing unit 114 performs image forming processes such as screen processing and error diffusion processing and generates a (binary) CMYK image 215. In step S216, the image processing unit 114 transmits the image data to the printer 115.

Figure 3:
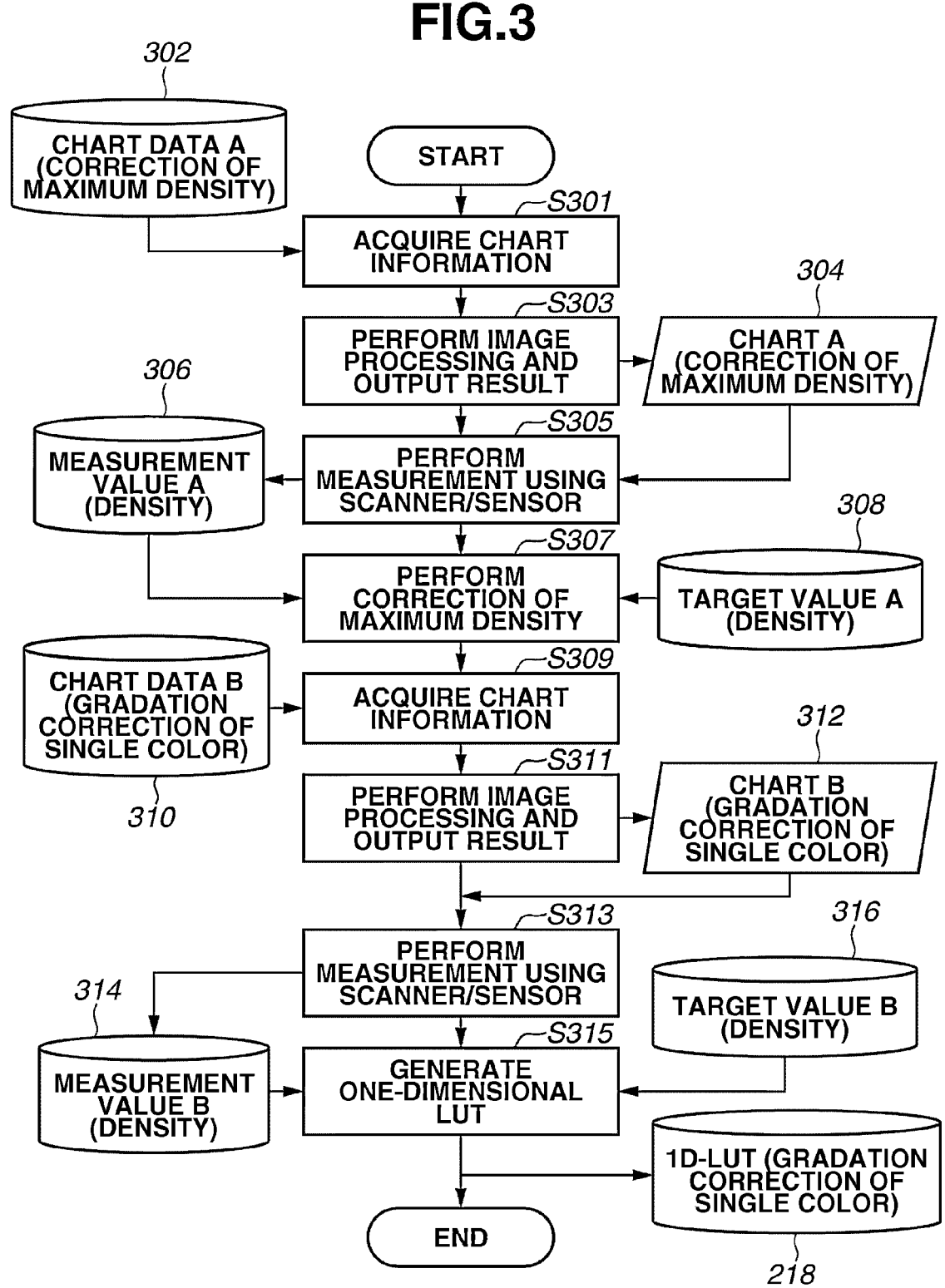
FIG. 3 is a flowchart illustrating single color calibration.

The single color calibration for correcting the gradation characteristics of the single color output from the printer 115 will be described below with reference to FIG. 3. FIG. 3 is a flowchart illustrating the process for generating the 1D-LUT 218 used in correcting the gradation characteristics of the single color. The flow illustrated in FIG. 3 is realized by the CPU 103 executing the process, and the generated 1D-LUT 218 is stored in the storing device 121. Further, the display device 118 displays the instruction to the user on the UI and the user instruction is received from the input device 120.

In step S301, the CPU 103 acquires chart data A 302 stored in the storing device 121. The chart data A 302 is used to correct maximum density of each single color, and is configured by a signal value (e.g., 255) at which maximum density data of the single C, M, Y, and K colors can be acquired.

Figure 5A:
FIGS. 5A, 5B, and 5C illustrate the charts used in performing single color calibration and mixed color calibration.
Figure 5B:
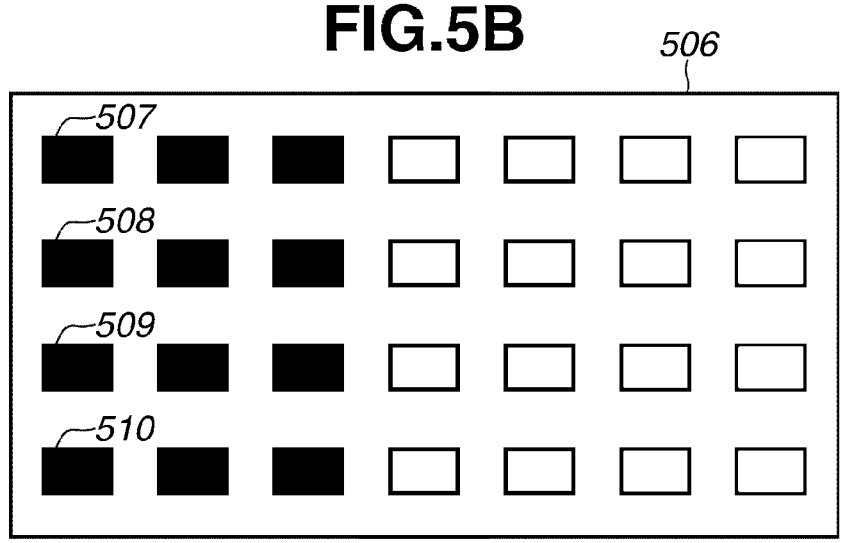
Figure 5C:
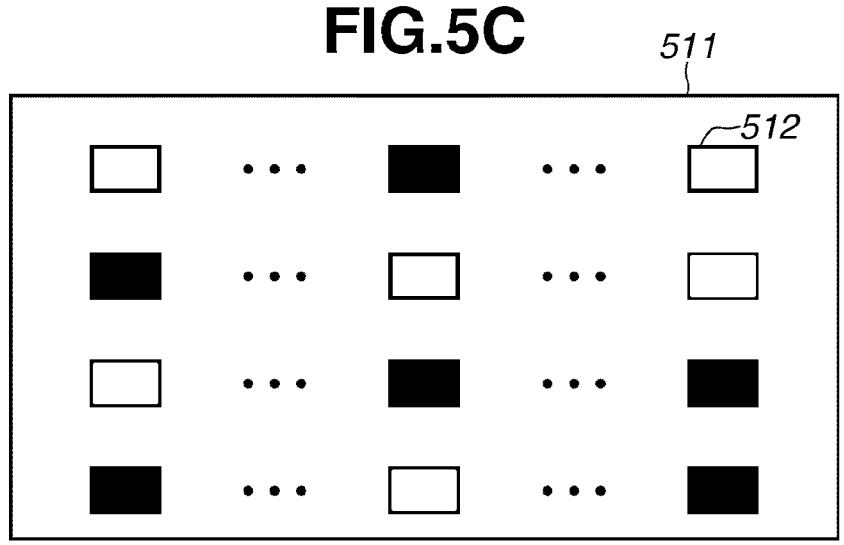

In step S303, the image processing unit 114 performs image processing on the chart data A 302 and outputs a chart A 304 from the printer 115. FIGS. 5A, 5B, and 5C illustrate examples of the chart data and the charts. Referring to FIG. 5A, chart data 501 indicates an example of the chart data A 302, and patches 502, 503, 504, and 505 are respectively output at the maximum density of each of the C, M, Y, and K colors. In step S214 illustrated in FIG. 2, the image processing unit 114 only performs halftone processing, and does not perform 1D-LUT correction in step S213 and 4D-LUT correction in step S212.

In step S305, the CPU 103 measures the chart A 304 using the scanner 119 and the sensor 127 in the measurement unit 126, and acquires measurement values A 306. The measurement values A 306 are density values of each of the C, M, Y, and K colors. In step S307, the CPU 103 corrects the maximum density of the measurement value A 306 of each color using the measurement value A 306 and the preset target value A 308 of the maximum density value. According to the present exemplary embodiment, device setting values of the printer 115 are adjusted so that the maximum density becomes close to the target value A 308.

In step S309, the CPU 103 acquires chart data B 310 stored in the storing device 121. The chart data B 310 is configured by the signal values of gradation data of each single color of the C, M, Y, and K. FIG. 5B illustrates an example of a chart B 312 including the patches output to the recording medium using the chart data B 310. Referring to FIG. 5B, a chart 506 illustrates an example of a chart B 312 including the patches output to the recording medium using the chart data B 310. Patches 507, 508, 509, and 510, and the gradation data to continue in a right direction are configured by the gradation data of each of the C, M, Y, and K colors.

In step S311, the image processing unit 114 performs image processing on the chart data B 310 and outputs the chart B 312 from the printer 115. The image processing unit 114 only performs halftone processing in step S214 illustrated in FIG. 2, and does not perform 1D-LUT correction in step S213 and 4D-LUT correction in step S212. Further, since the maximum density is corrected in step S307, the printer 115 is capable of outputting the value of the maximum density equivalent to the target value A 308.

In step S313, the CPU 103 performs measurement using the scanner 119 and the sensor 127, and acquires a measurement value B 314. The measurement value B 314 is the density value acquired from the gradation of each of the C, M, Y, and K colors. In step S315, the CPU 103 generates the 1D-LUT 218 for correcting the single color gradation, using the measurement value B 314 and a preset target value B 316.

Figure 4:
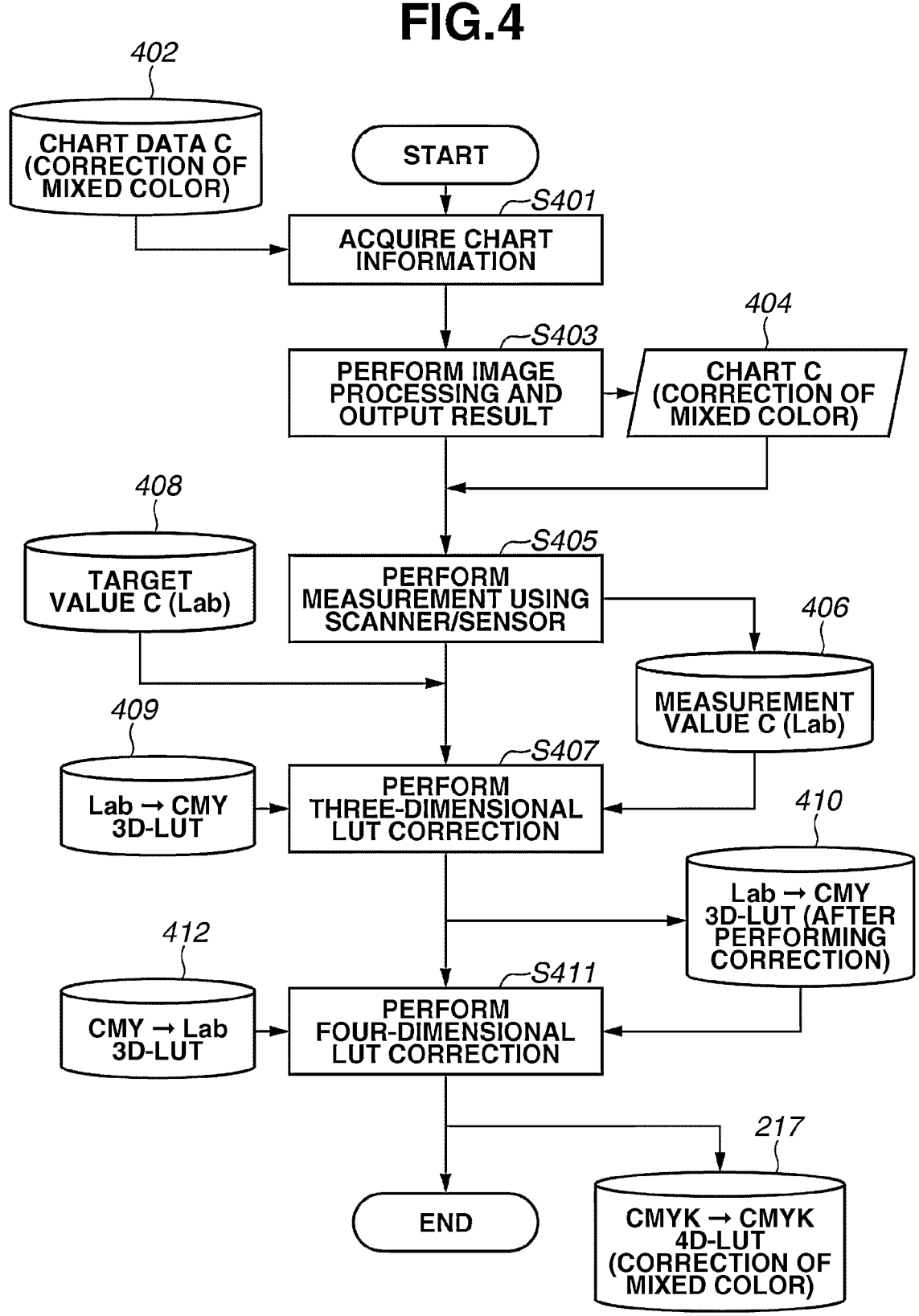
FIG. 4 is a flowchart illustrating mixed color calibration.

The mixed color calibration for correcting the characteristics of the mixed color output from the printer 115 will be described below with reference to FIG. 4. The flow illustrated in FIG. 4 is realized by the CPU 103 in the controller 102 executing the process, and the acquired 4D-LUT 217 is stored in the storing device 121. Further, the display device 118 displays the instruction to the user on the UI, and the user instruction is received from the input device 120.

The mixed color calibration corrects the mixed color output from the printer 115 in which the single color calibration has been performed. It is thus desirable to perform mixed calibration immediately after performing single color calibration.

In step S401, the CPU 103 acquires information on chart data C 402 configured of the mixed colors, stored in the storing device 121. The chart data C 402 is the data for correcting the mixed colors, and is configured by the signal values of the mixed colors, i.e., a combination of C, M, Y, and K. FIG. 5C illustrates an example of a chart C 404 including the patches output to the recording medium using the chart data C 402. Referring to FIG. 5C, a chart 511 illustrates an example of the chart data C 402, and a patch 512 and all of the patches printed on the chart 511 are configured by the mixed colors acquired by combining C, M, Y, and K.

In step S403, the image processing unit 114 performs image processing on the chart data C 402, and outputs a chart C 404 by the printer 115. Since the mixed color calibration corrects the mixed color characteristics of the device after the single color calibration is performed, the image processing unit 114 performs image processing using the 1D-LUT 218 generated when performing the single color calibration.

In step S405, the CPU 103 measures the chart C 404 using the scanner 119 and the sensor 127 in the measurement unit 126, and acquires a measurement value C 406. The measurement value C 406 indicates the mixed color characteristics of the printer 115 after the single color calibration is performed. Further, the measurement value C 406 is a value in the device-independent color space, and is the Lab color space according to the present exemplary embodiment. If the scanner 119 is used in performing measurement, the RGB value is converted into the Lab value using a three-dimensional LUT (3D-LUT) (not illustrated).

In step S407, the CPU 103 acquires a Lab to CMY 3D-LUT 409 stored in the storing device 121. The CPU 103 then reflects the difference between the measurement value C 406 and a preset target value C 408 on the 3D-LUT 409 and generates a Lab to CMY 3D-LUT 410 (after correction). The Lab to CMY 3D-LUT is a 3D-LUT that outputs a CMY value corresponding to the input Lab value.

The method for generating the 3D-LUT will be described in detail below. The difference between the measurement value C 406 and the preset target value C 408 is added to the Lab value on an input side of the Lab to CMY 3D-LUT 409. Interpolation is then performed on the Lab value on which the difference is reflected, using the Lab to CMY 3D-LUT 409. As a result, the Lab to CMY 3D-LUT (after correction) 410 is generated.

In step S411, the CPU 103 acquires a CMY to Lab 3D-LUT 412 stored in the storing device 121, and performs calculation using the Lab to CMY 3D-LUT (after correction) 410. The CPU 103 thus generates the CMYK to CMYK 4D-LUT 217. The CMY to Lab 3D-LUT is a 3D-LUT that outputs the Lab value corresponding to the input CMY value.

The method for generating the CMYK to CMYK 4D-LUT 217 will be described in detail below. A CMY to CMY 3D-LUT is generated from the CMY to Lab 3D-LUT 412 and the Lab to CMY 3D-LUT (after correction) 410. The CMYK to CMYK 4D-LUT 217 is then generated so that the input value and the output value of K become the same. The CMY to CMY 3D-LUT is a 3D-LUT that outputs the CMY value after performing correction, corresponding to the input CMY value.

The storing device 121 in the MFP 101 can store a target value C employed in generating the calibration table corresponding to each type of sheet used in performing printing, and time stamp information indicating the time at which the target value C has been registered.

Further, the storing device 121 can store the time stamp information of when the calibration tables 1D-LUT 218 and 4D-LUT 217 were generated, and sheet information indicating the types of sheet (paper types) used when generating the 1D-LUT 218 and the 4D-LUT 217.

Figure 12:
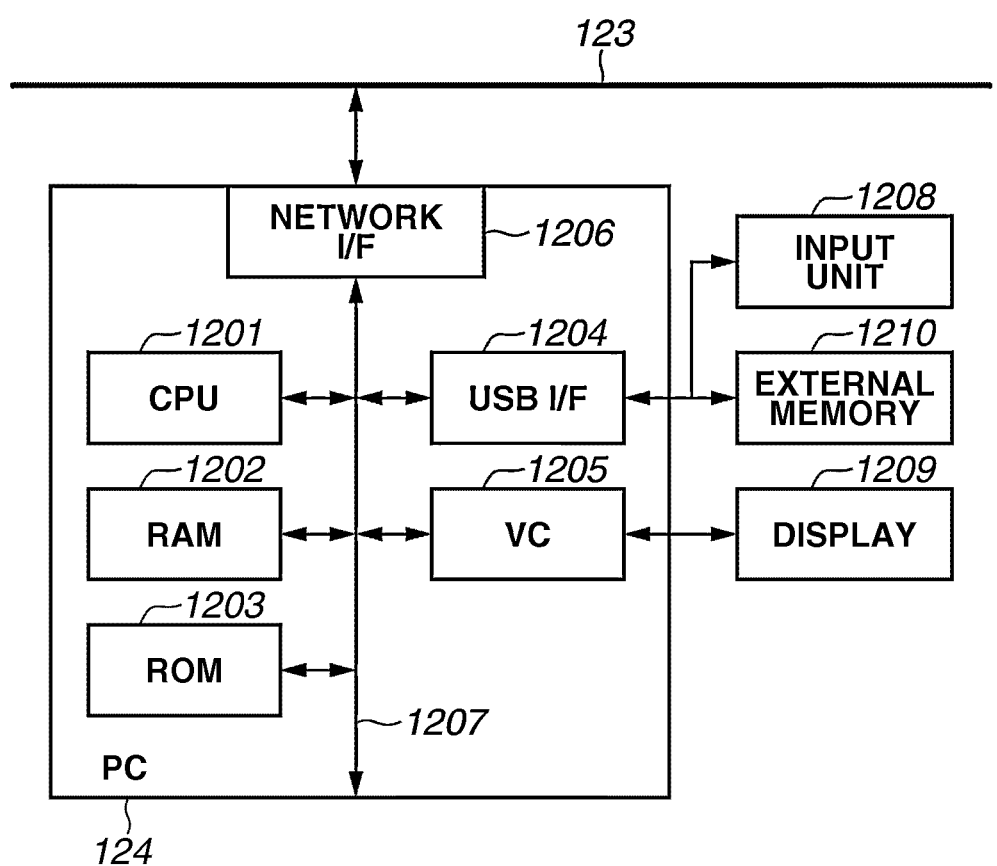
FIG. 12 illustrates an example of a system configuration of a personal computer (PC).

FIG. 12 illustrates in detail the configuration of the PC 124, i.e., an information processing apparatus.

Referring to FIG. 12, the PC 124 includes a CPU 1201 that executes programs stored in a read-only memory (ROM) 1203 or an external memory 1210. The CPU 1201 collectively controls each of the devices connected to a system bus 1207.

The external memory 1210 stores an operating system (OS), i.e., a control program of the CPU 1201, and programs such as software that runs on the OS.

A random access memory (RAM) 1202 functions as a main memory and a work area of the CPU 1201.

A universal serial bus (USB) I/F 1204 controls communication with USB devices. For example, an input unit 1208, such as a keyboard and a pointing device, and the external memory 1210 are connected to the PC 1204 via the USB I/F 1204.

A video card (VC) 1205 controls displaying on a display 1209, i.e., a display unit.

A network I/F 1206 is an interface module with respect to the external network 123. The PC 124 is connectable to the MFP 101 via the network 123.

According to the present exemplary embodiment, the program of the driver 125 is stored in the external memory 1210. The CPU 1201 loads the driver 125 to the RAM 1202, and the CPU 1201 realizes all of the operations of the driver 125 to be described below by performing the processes according to a program code of the driver 125.

Further, the display 1209 displays a user interface screen of the driver 125, and the CPU 1201 detects an input instruction from the input unit 1208 and executes the process.

According to the present exemplary embodiment, the MFP 101 is used as the image processing apparatus. Further, if the type of sheet designated when performing printing is different from the type of sheet on which the calibration table has been generated, the paper feed stage storing the appropriate type of sheet is displayed.

Figure 13:
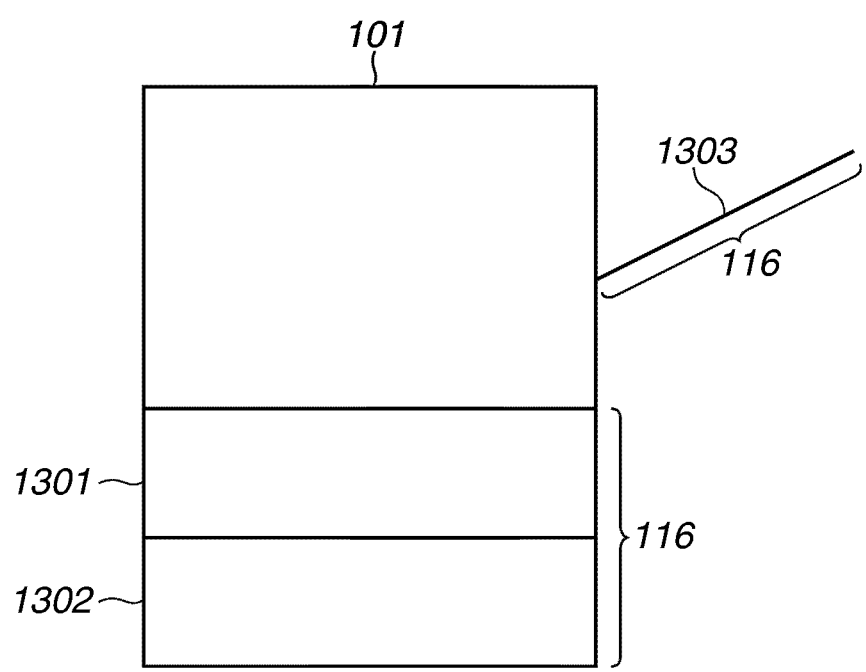
FIG. 13 illustrates an example of a configuration of the paper feed stages.

FIG. 13 illustrates an example of the paper feed unit 116 in the MFP 101. Referring to FIG. 13, the MFP 101 includes a first paper feed stage 1301 and a second paper feed stage 1302 which are trays that store the sheets, and a third paper feed stage 1303 for manually feeding the sheets. Different types of sheets can be stored in each paper feed stage. The user inputs from the input device 120, sheet information, i.e., information on the stored sheets, and the CPU 103 stores the sheet information in the storing device 121. According to the present exemplary embodiment, the MFP 101 includes the first, second, and third paper feed stages. However, the paper feed stages are not limited to the forms such as the tray and for manual feeding. For example, a paper feed unit capable of storing a large amount of sheets may be connected to outside the main body of the MFP 101. The paper feed stages may be in any form as long as there is one or more paper feed stages of the MFP 101.

Figure 6:
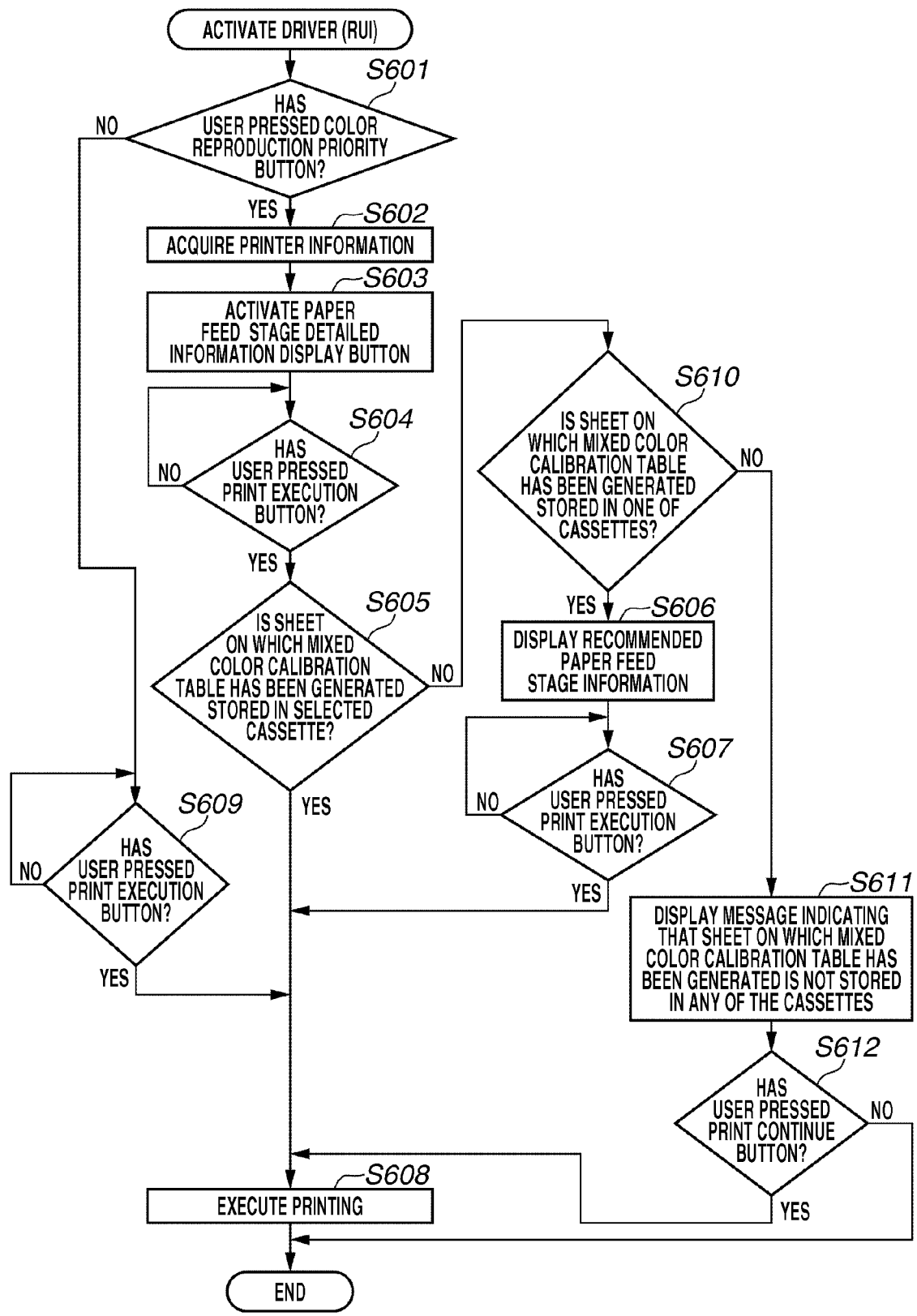
FIG. 6 is an example of a flowchart illustrating a process performed according to a first exemplary embodiment of the present invention.

FIG. 6 is a flowchart illustrating the process performed according to the present exemplary embodiment.

Figure 7:
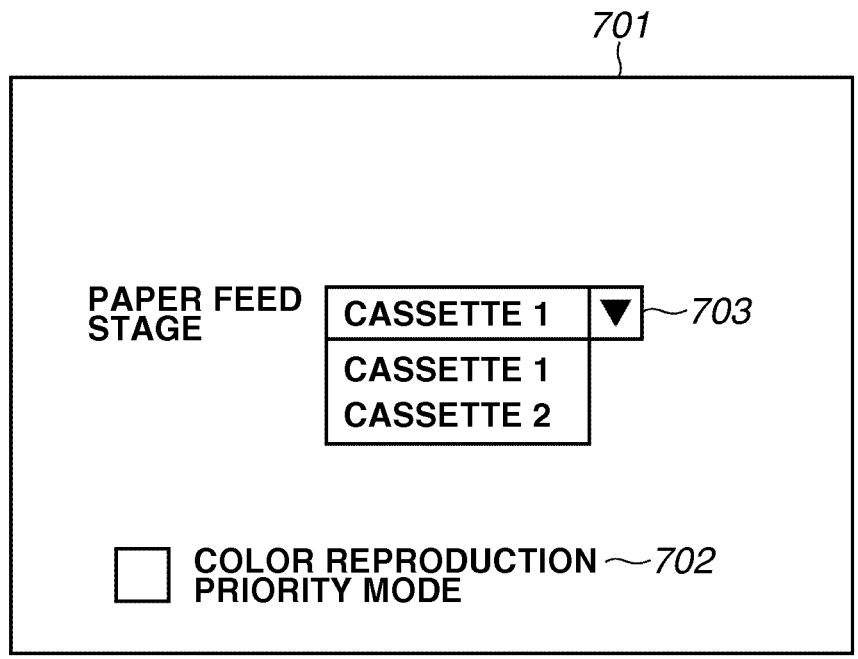
FIG. 7 illustrates an example of a driver screen including a color reproduction priority mode radio button.

When the driver 125 is activated on the PC 124, the CPU 1201 displays on the display 1209 a driver screen 701 as illustrated in FIG. 7. Referring to FIG. 7, the driver screen 701 includes a color reproduction priority mode button 702 which is a button for selecting whether to prioritize color reproduction. The color reproduction priority mode is selected when performing printing that prioritizes image quality. If a user selects the color reproduction priority mode, control is performed so that printing is executed using the sheet on which the calibration table has been generated. The user may designate on the driver 125, the sheet in the paper feed stage among one or more of the paper feed stages in the MFP 101, to be used in printing. For example, a paper feed stage selection box 703 may be included in the screen 701 for selecting the paper feed stage.

In step S601 illustrated in FIG. 6, the CPU 1201 determines whether the user has pressed the color reproduction priority mode button 702 using the input unit 1208.

If the CPU 1201 determines that the user has pressed the color reproduction priority mode radio button 702 (YES in step S601), the processing proceeds to step S602. In step S602, the CPU 1201 communicates with the MFP 101 via the network 123. As a result, the CPU 1201 acquires printer information that at least includes calibration information and paper feed stage information of the MFP 101, and stores the acquired information in the RAM 1202. Further, the printer information may be automatically transmitted from the MFP 101 to all of the PC 124 connected to the MFP 101. In such a case, the printer information is transmitted to the PC 124 each time the printer information is changed on the MFP 101.

The printer information acquired in step S602 includes the paper feed stage information and the calibration information.

The paper feed stage information includes the size and the grammage of the sheet stored in each paper feed stage, and information on whether the target value C used when generating the calibration table is registered. The paper feed stage information is stored in the storing device 121. Further, the paper feed stage information may include characteristic information of the sheet related to color reproduction after printing, such as the sheet surface texture and the chromaticity of the sheet. Furthermore, the calibration information is the information indicating the type of sheet used when generating the 4D-LUT 217 stored in the storing device 121.

Figure 8:
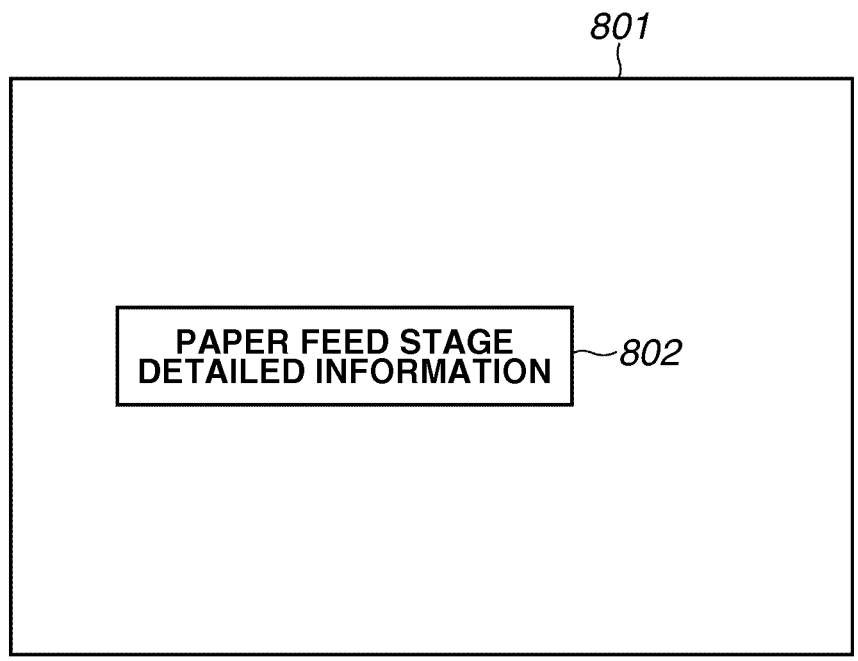
FIG. 8 illustrates an example of a driver screen including a paper feed stage detailed information display button.

In step S603, the CPU 1201 displays on the display 1209 a button 802 for displaying the paper feed stage detail information on a screen 801 as illustrated in FIG. 8. The screen 801 may be displayed on the same screen as the screen 701. In such a case, the color reproduction priority mode button 702 is also displayed. The operation performed when the paper feed stage detail information button is pressed will be described below.

Figure 14A:
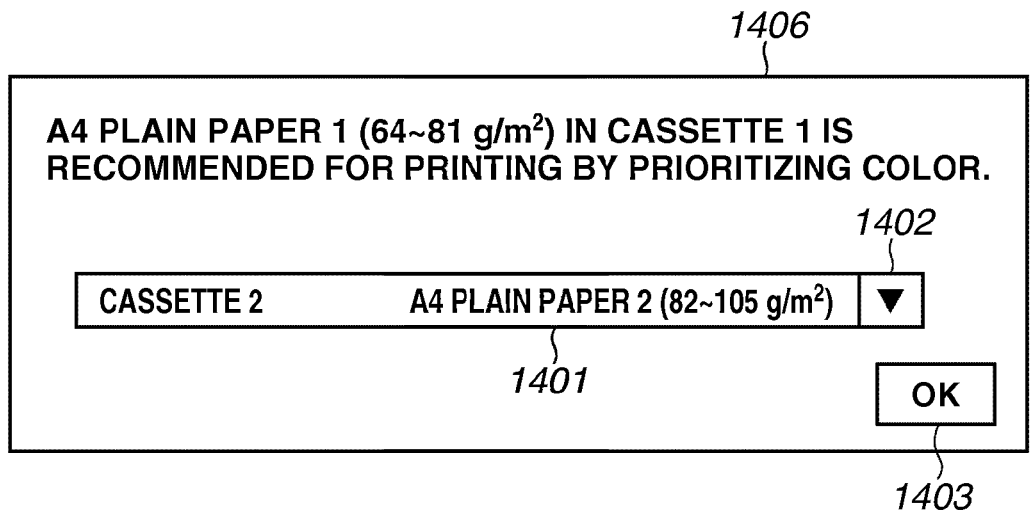
FIGS. 14A and 14B illustrate examples of a recommended paper feed stage screen.
Figure 14B:
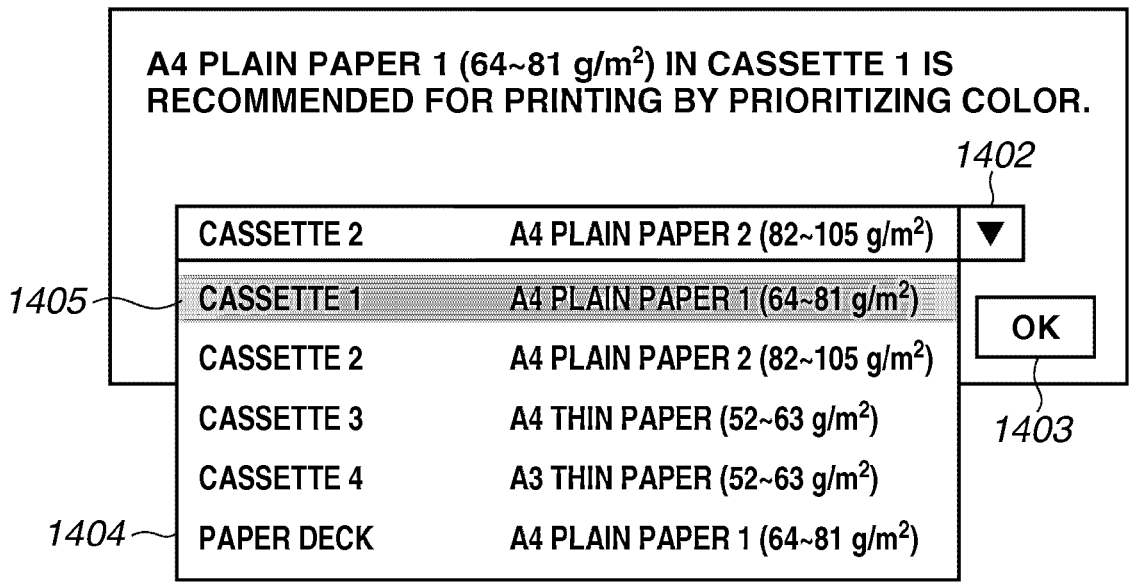

In step S604, the CPU 1201 determines whether an instruction to perform printing has been received from the input unit 1208. If the CPU 1201 has detected receiving such an instruction (YES in step S604), the CPU 1201 refers to the printer information. The processing then proceeds to step S605. In step S605, the CPU 1201 determines whether the sheet on which the mixed color calibration table has been generated is stored in the paper feed stage selected on the paper feed stage selection box 703. If the CPU 1201 determines that the sheet on which the mixed color calibration table has been generated is stored in the selected paper feed stage (YES in step S605), the processing proceeds to step S608. In step S608, the CPU 1201 generates and transmits to the MFP 101 the print data, and the printing processing ends. On the other hand, if the CPU 1201 determines that the sheet on which the mixed color calibration table has been generated is not stored in the selected paper feed stage (NO in step S605), the processing proceeds to step S610. In step S610, the CPU 1201 determines whether the sheet on which the mixed color calibration table has been generated is stored in one of the paper feed stages. If the CPU 1201 determines that the sheet on which the mixed color calibration table has been generated is stored in one of the paper feed stages (YES in step S610), the processing proceeds to step S606. In step S606, the CPU 1201 displays on the display 1209 a recommended paper feed stage screen 1406 as illustrated in FIG. 14A. The recommended paper feed stage screen 1406 notifies the user of the sheet on which the mixed screen calibration table has been generated and the paper feed stage storing the sheet, and recommends using the sheet stored in the paper feed stage for performing printing. Further, the recommended paper feed stage screen 1406 includes a selected paper feed stage display area 1401 which displays the currently selected paper feed stage, a pull down button 1402 for re-selecting the paper feed stage, and an OK button 1403 for inputting that the paper feed stage has been selected. FIG. 14B illustrates an example of display content when the user has pressed the pull down button 1402 illustrated in FIG. 14A. Referring to FIG. 14B, the paper feed stages in the MFP 101 are displayed as a list 1404. The user can select from the input unit 1208 the paper feed stage storing the sheet to be actually used in printing. The selected paper feed stage is displayed as a highlighted item 1405.

In step S607, the CPU 1201 determines whether the user has pressed the OK button 1403 for inputting the print instruction. If the CPU 1201 determines that the user has pressed the OK button 1403 (YES in step S607), the processing proceeds to step S608. In step S608, the CPU 1201 generates and transmits to the MFP 101 the print data, and the printing processing ends.

If the CPU 1201 determines that the sheet on which the mixed color calibration table has been generated is stored in a plurality of the paper feed stages (YES in step S610), the CPU 1201 may recommend as follows. The CPU 1201 may recommend using the sheet having similar characteristics as those of the sheet selected on the paper feed stage selection box 703, among the sheets stored in the plurality of the paper feed stages. The sheet having similar characteristics is a sheet in which the difference in the grammage or the chromaticity between the sheet and the selected sheet is less than or equal to a preset threshold value, or a sheet in which the characteristics have been preset to be similar.

If the CPU 1201 determines that the user has not pressed the color reproduction priority mode button 702 (NO in step S601), the processing proceeds to step S609. In step S609, the CPU 1201 waits for an input for performing printing on the input unit 1208 (NO in step S609). If there is an input for performing printing (YES in step S609), the processing proceeds to step S608.

Further, if the CPU 1201 determines that none of the paper feed stages stores the sheet on which the mixed color calibration table has been generated (NO in step S610), the processing proceeds to step S611. In step S611, the CPU 1201 displays on the display 1209 a screen as illustrated in FIG. 15. Referring to FIG. 15, the screen notifies the user that the sheet on which the mixed calibration table has been generated is not stored in any of the paper feed stages. The screen includes a print continue button 1501 for continuing printing using the sheet stored in the currently selected paper feed stage, and a print cancel button 1502 for cancelling printing.

In step S612, the CPU 1201 determines whether the user has pressed the print continue button 1501. If the CPU 1201 determines that the user has pressed the print cancel button 1502 (NO in step S612), the CPU 1201 ends all printing processes. If the CPU 1201 determines that the user has pressed the print continue button 1501 (YES in step S612), the processing proceeds to step S608.

Figure 11:
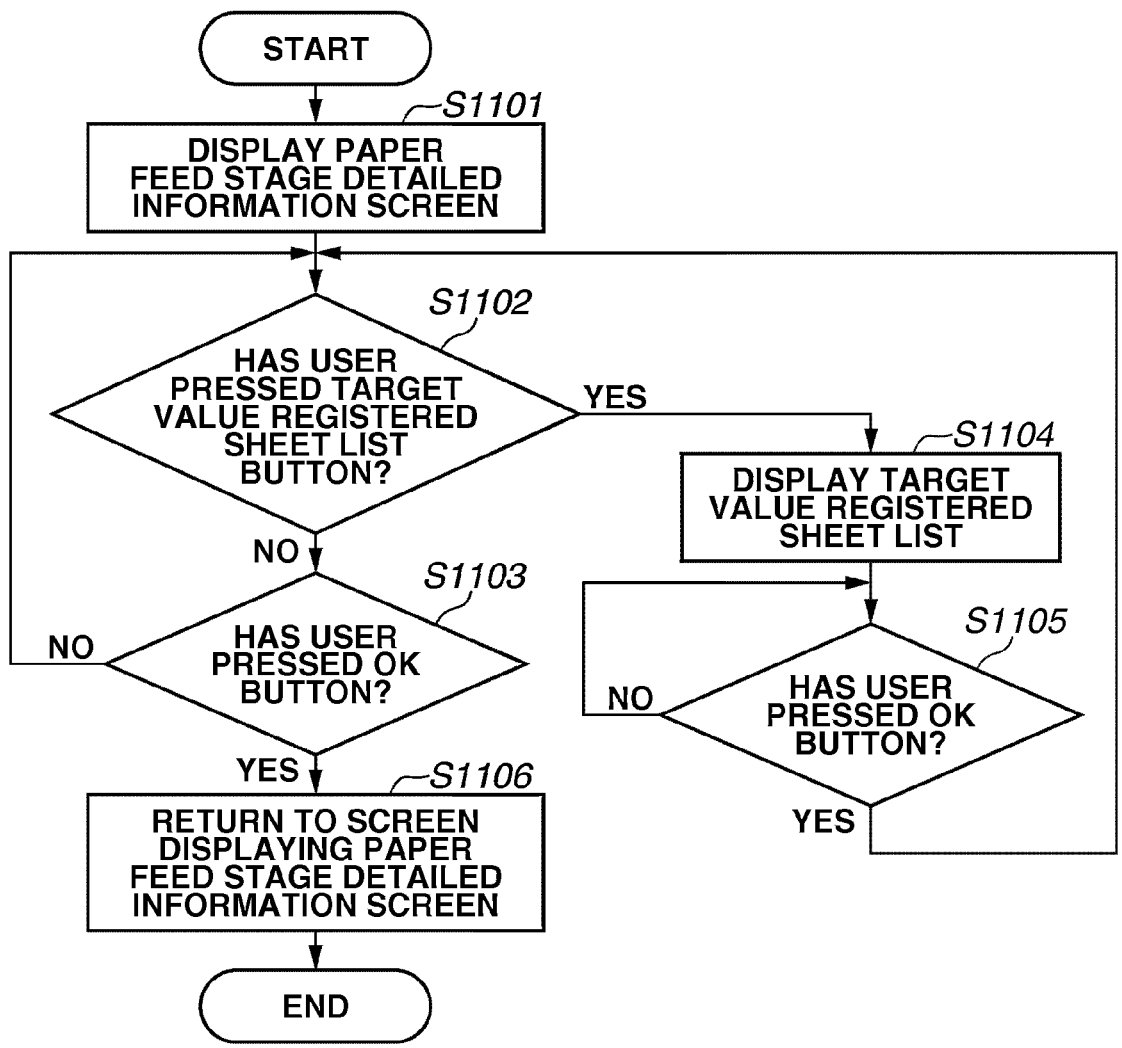
FIG. 11 is an example of a flowchart illustrating a process performed when the paper feed stage detailed information button is pressed.

The operation performed when the user has pressed the paper feed stage detailed information display button 802 displayed in step S603 will be described below with reference to the flowchart illustrated in FIG. 11.

If the CPU 1201 detects that the user has pressed the paper feed stage detailed information display button 802, the processing proceeds to step S1101, and the CPU 1201 displays on the display 1209 a paper feed stage detailed information screen 901 as illustrated in FIG. 9.

Referring to FIG. 9, the paper feed stage detailed information screen 901 displays all "paper feed stages" 902 and "sheet" information 903 on the sheets stored in each paper feed stage.

Further, "correction performed" information 904 indicating whether the mixed color calibration table has been generated with respect to the sheet is displayed as a list. Furthermore, "target value" information 905 indicating whether the target value C used when generating the calibration table is registered is displayed as a list.

According to the present exemplary embodiment, the MFP 101 includes 5 paper feed stages, and each paper feed stage is uniquely named for each type of MFP 101. For example, the tray-type paper feed stage is referred to as a "cassette", and the paper feed stage unit connected to outside the MFP 101 main body and capable of storing a large amount of sheets is referred to as a "paper deck". However, the present exemplary embodiment is applicable if the MFP 101 includes one or more paper feed stages regardless of the different number of paper feed stages depending on the configuration of the MFP 101.

Further, if there is a greater number of paper feed stages as compared to the number that can be displayed on the paper feed stage detailed information screen 901, a user can operate on a scroll portion 906 so that the display content can be displayed by page feeding. According to the present exemplary embodiment, there is a scroll portion in which the user vertically moves a scroll bar, or the user presses an upward or a downward arrow to feed the page.

As described above, if the user views the display 1209 on which the paper feed stage detailed information screen 901 is displayed, the user can recognize that the sheet on which the mixed calibration table has been generated is stored in cassette 1 and the paper deck. In other words, when performing printing, the user can confirm the paper feed stage storing the sheet on which the mixed calibration table has been generated.

As a result, if the user uses such a sheet and performs printing, the printed product which has been appropriately corrected using the calibration table can be output from the MFP 101.

Further, the paper feed stage detailed information screen 901 includes a target value registered sheet list button 907 for displaying a screen 1001 indicating a list of sheets in which the target value C set to each paper type has been registered. Furthermore, the paper feed stage detailed information screen 901 includes an OK button 908 for returning to the driver screen 801.

Upon displaying the paper feed stage detailed information screen 901 in step S1101, the processing proceeds to step S1102. In step S1102, the CPU 1201 determines whether the user has pressed the target value registered sheet list button 907 via the input unit 1208. If the CPU 1201 determines that the user has not pressed the target value registered sheet list button 907 (NO in step S1102), the processing proceeds to step S1103. In step S1103, the CPU 1201 determines whether the user has pressed the OK button 908. If the CPU 1201 determines that the user has not pressed the OK button 908 (NO in step S1103), the processing returns to step S1102, and the CPU 1201 re-determines whether the user has pressed the target value registered sheet list button 907. If the CPU 1201 determines that the user has pressed the OK button 908 (YES in step S1103), the processing proceeds to step S1106. In step S1106, the CPU 1106 returns the screen to the screen 801, and the processing ends. If the CPU 1201 determines that the user has pressed the target value registered sheet list button 907 (YES step S1102), the processing proceeds to step S1104. In step S1104, the CPU 1201 displays on the display 1201 a target value registered sheet list screen 1001 illustrated in FIG. 10.

Referring to FIG. 10, the target value registered sheet list screen 1001 includes "target value registered sheet" information 1003 indicating all types of sheets of which the target value C has been registered, "registration date and time" information 1004, and "correction performed" information 1002 indicating whether the mixed calibration table has been generated with respect to the sheet. If there is a greater number of registered sheet information than the number that can be displayed on the screen, the user can operate on a scroll portion 1005 and perform page feeding of the display content. According to the present exemplary embodiment, there is a scroll portion on which the user vertically moves a scroll bar, or the user presses an upward or a downward arrow to feed the page.

Further, the target value registered sheet list screen 1001 includes an OK button 1006 for returning to the paper feed stage detailed information screen 901.

Upon displaying the target value registered sheet list screen in step S1104, the processing proceeds to step S1105. In step S1105, the CPU 1201 determines whether the user has pressed the OK button 1006. If the user has pressed the OK button 1006 (YES in step S1105), the processing returns to step S1102.

The paper feed stage detailed information screen 901 and the target value registered sheet list screen 1001 are displayed on each screen of the driver 125 as a result of performing the above-described processes, so that the displayed content can be notified to the user by simple operation. The user can thus easily confirm the paper feed stage storing the sheet on which the calibration table has been generated. Further, the recommended paper feed stage screen 1406 is capable of notify the user of the type of sheet or the paper feed stage storing the type of sheet that allows outputting the printed product in which the gradation characteristics and the mixed colors are corrected using the appropriate table. An appropriately corrected printed product can thus be provided.

According to the present exemplary embodiment, paper feed control is performed so that the paper type which is the same as the sheet on which the mixed color calibration table has been generated is used when performing printing. However, it is not limited thereto.

More specifically, the paper feed control can be performed so that the paper type which is the same as the sheet on which the single color calibration table has been generated is used when performing printing. In such a case, it is necessary for the calibration information in the printer information to include the information indicating the sheet on which the 1D-LUT 218 for performing the single color calibration has been generated. Further, it is necessary for the paper feed stage information to include the information indicating whether the target value used when generating the single color calibration table is registered.

Further, paper feed control can be similarly performed when printing so that the sheet of the same paper type as the sheet on which the single color calibration table and the mixed color calibration table have been generated is used in printing.

The fluctuations in density and color are greater in the electrophotographic image processing apparatus as compared to the printing device due to instability unique to the method thereof. As a result, printed image quality becomes more likely to be degraded due to the fluctuations in the density and the color as longer time elapses after correction by performing calibration.

According to a second exemplary embodiment, when the processing described according to the first exemplary embodiment is to be performed, timing for performing calibration is prompted, so that usability is improved. Such a method will be described below.

Figure 16A:
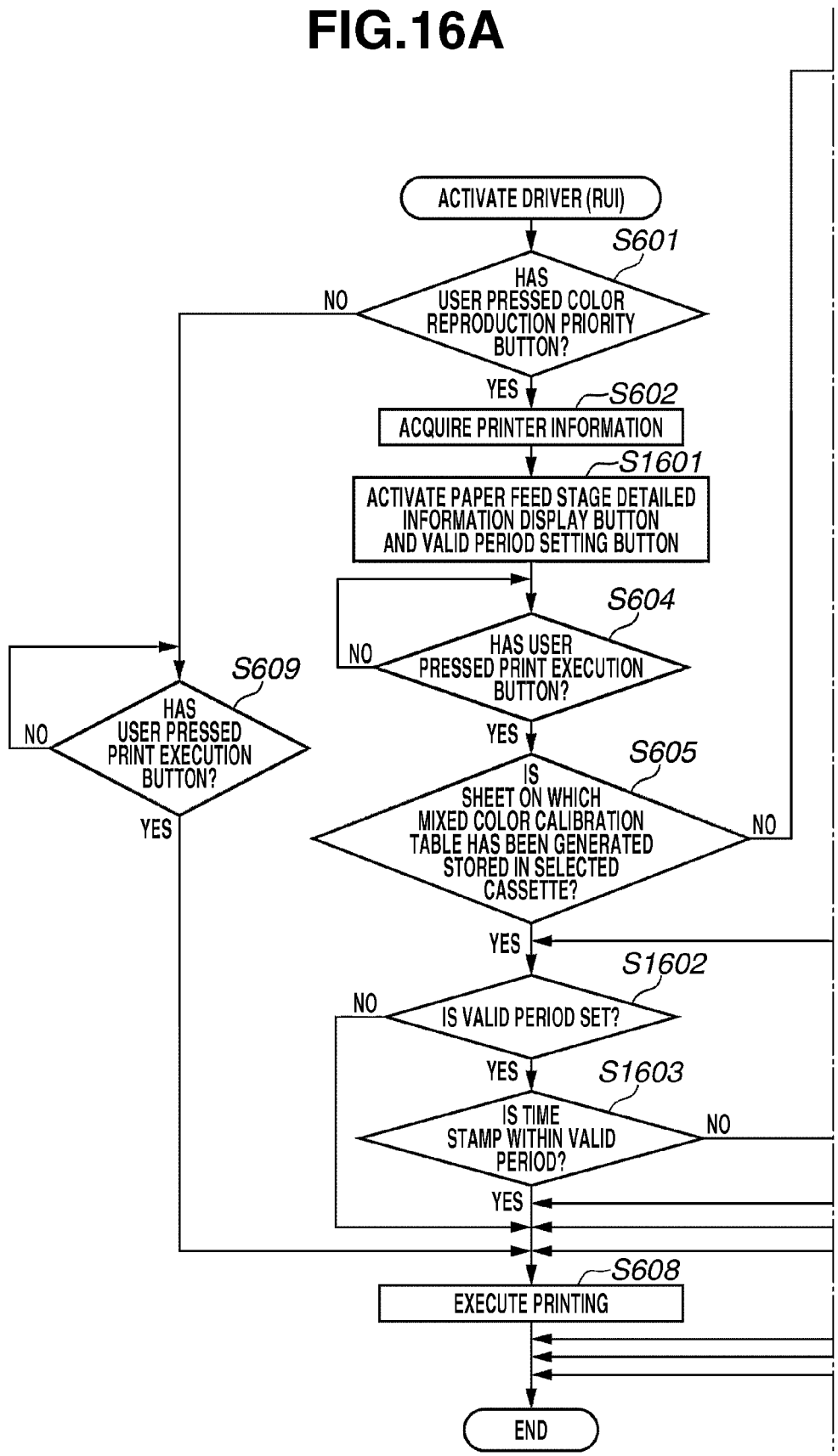
FIGS. 16A and 16B are an example of a flowchart illustrating a process performed according to a second exemplary embodiment of the present invention.
Figure 16B:
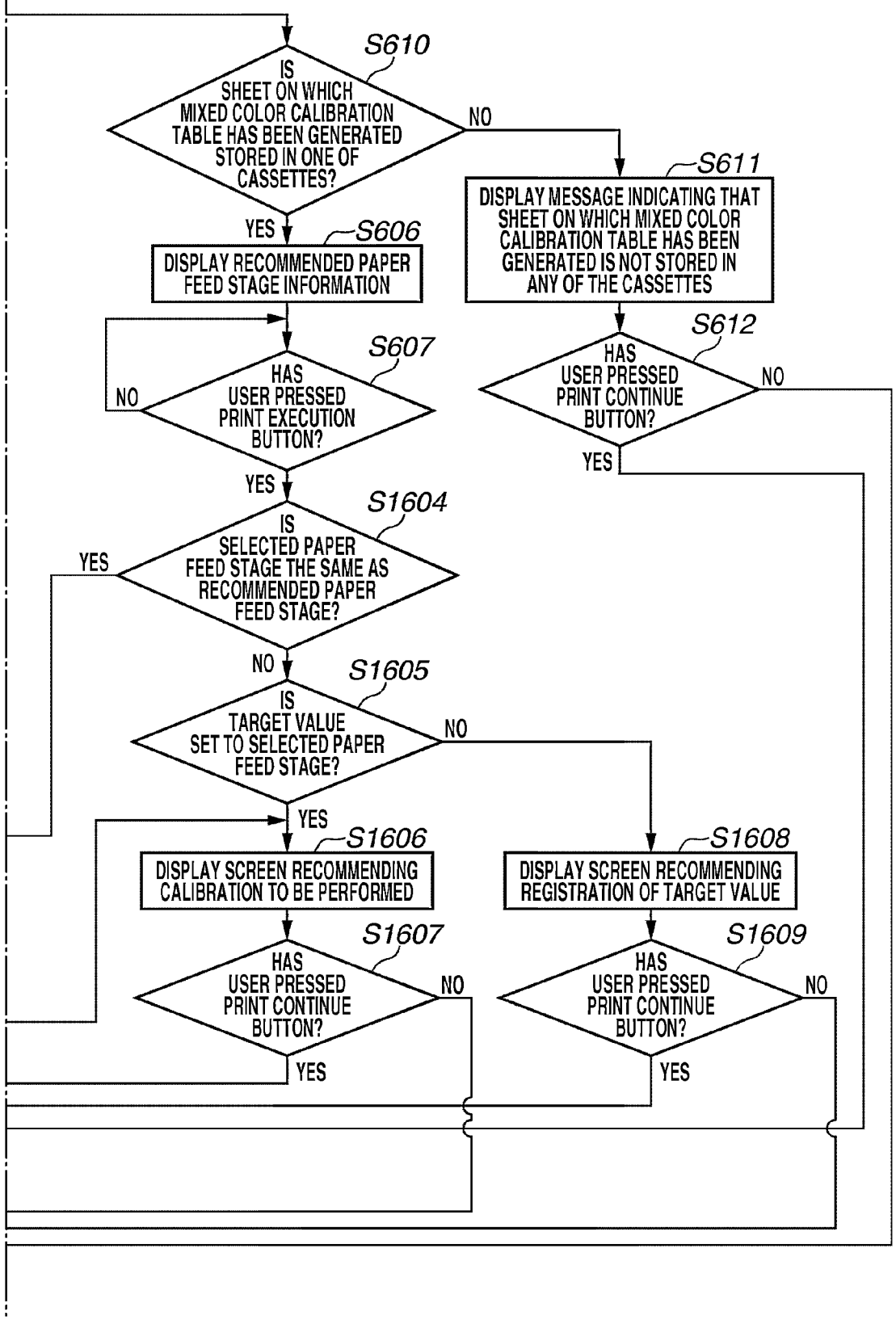

FIGS. 16A and 16B are a flowchart illustrating the processing performed according to the present exemplary embodiment. Since the steps having the same reference numbers as those of the flowchart illustrated in FIG. 6 perform the processing as described above, the description thereof will be omitted.

Figure 18:
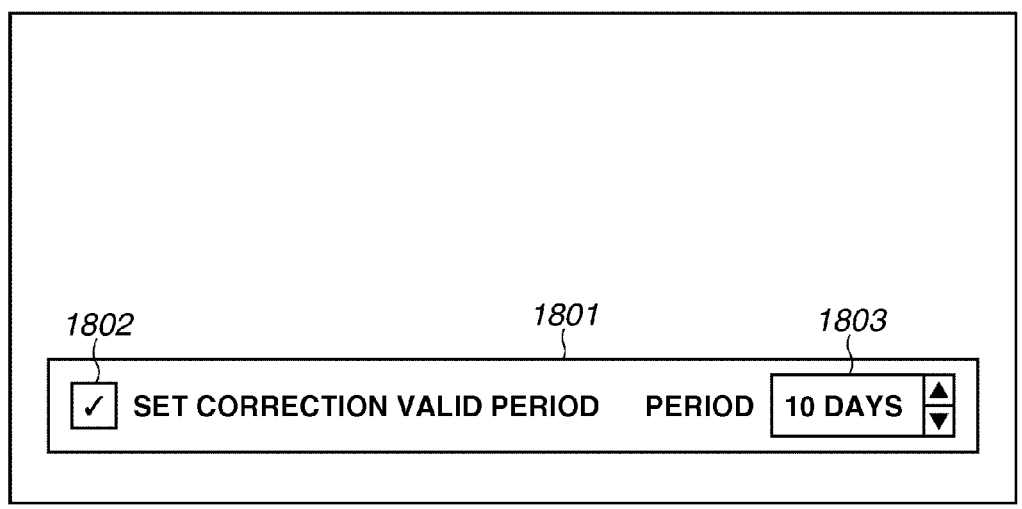
FIG. 18 illustrates an example of a driver screen including a valid period setting unit.

After the driver 125 in the PC 124 becomes activated and the CPU 1201 performs the process of step S602, the processing proceeds to step S1601. In step S1601, the CPU 1201 displays on a screen as illustrated in FIG. 18 a valid period setting unit 1801 for setting a period in which the correction is valid. The screen may be displayed on the same screen as the screens 701 and 801. In such a case, the valid period setting unit 1801 is displayed along with the color reproduction priority mode button 702 and the paper feed stage detailed information display button 802. The valid period setting unit 1801 includes a valid period setting radio button 1802 for setting whether to enable valid period setting, and a period input unit 1803 for setting the period. The period input unit 1803 may be incremented and decremented by days or by other units of time. According to the present exemplary embodiment, the user can increment and decrement the period by days using upward and downward arrows arranged on the right side of the period input unit 1803.

The process performed when the user has pressed the paper feed stage detailed information display button 802 displayed in step S1601 will be described below. The operation flow is performed according to the flowchart illustrated in FIG. 11. The process is different from the process described according to the first exemplary embodiment in that the screen to be displayed is a second paper feed stage detailed information screen 1701 illustrated in FIG. 17 instead of the paper feed stage detailed information screen 901 illustrated in FIG. 9.

The second paper feed stage detailed information screen 1701 is different from the paper feed stage detailed information screen 901 in at least the following points. The second paper feed stage detailed information screen 1701 includes second "correction performed" information 1702. The second "correction performed" information 1702 includes information indicating whether the sheet stored in each paper feed stage is the sheet on which the mixed color calibration table has been generated, and the time stamp information indicating the time at which the calibration table has been generated.

Further, the second paper feed stage detailed information screen 1701 includes "correction valid period" information 1703 indicating whether the second "correction performed" information 1702 is within the correction valid period. The "correction valid period" information 1703 is determined from the current date and time, the second "correction performed" information 1702, and the valid period of correction performed using the generated calibration table input from the period input unit 1803.

The user can recognize by confirming the second "correction performed" information 1702 in the second paper feed stage detailed information screen 1701 that the sheets on which the mixed calibration table has been generated are stored in the cassette 1 and the paper deck. Further, the user can determine by confirming the "correction valid period" information 1703 in the second paper feed stage detailed information screen 1701 whether the second "correction performed" information 1702 is within the valid period of correction performed using the generated calibration table. As a result, the user can easily determine whether to regenerate the calibration table based on such information.

More specifically, when performing printing, the user can confirm the paper feed stage storing the sheet on which the calibration table has been generated. Further, the user can easily determine at the same time whether to regenerate the calibration table with respect to the sheet.

In step S605, the CPU 1201 determines whether the sheet on which the mixed color calibration table has been generated is stored in the paper feed stage selected on the paper feed stage selection box 703. If the CPU 1201 determines that the sheet on which the mixed color calibration table has been generated is stored in the selected paper feed stage (YES in step S605), the processing proceeds to step S1602. In step S1602, the CPU 1201 determines whether the user has pressed the valid period setting radio button 1802. If the CPU 1201 determines that the user has not pressed the valid period setting radio button 1802 (NO in step S1602), the processing proceeds to step S608. In step S608, the CPU 1201 generates and transmits to the MFP 101 the print data, and the printing processing ends. On the other hand, if the CPU 1201 determines that the user has pressed the valid period setting radio button 1802 (YES in step S1602), the processing proceeds to step S1603. In step S1603, the CPU 1201 refers to the "correction valid period" information 1703. The CPU 1201 then determines whether the elapsed time from the time stamp indicating the timing at which the calibration table has been generated is within the valid period. If the CPU 1201 determines that the elapsed time from the time stamp is within the valid period (YES in step S1603), the processing proceeds to step S608. In step S608, the CPU 1201 generates and transmits to the MFP 101 the print data, and the printing processing ends. If the CPU 1201 determines that the elapsed time from the time stamp indicating the timing at which the calibration table with respect to the sheet stored in the selected paper feed stage has been generated is not within the valid period (NO in step S1603), the processing proceeds to step S1606 to be described below.

If the CPU 1201 determines that the user has pressed the OK button 1403 in the recommended paper feed stage screen 1406 (YES in step S607), the processing proceeds to step S1604. In step S1604, the CPU 1201 determines whether the paper feed stage last selected on the recommended paper feed stage screen 1406 is the same as the recommended paper feed stage. If the CPU 1201 determines that the paper feed stages are the same (YES in step S1604), the processing proceeds to step S1602. If the CPU 1201 determines that the paper feed stages are not the same (NO in step S1604), the processing proceeds to step S1605. In step S1605, the CPU 1201 refers to the printer information, and determines whether the target value C to be used for generating the calibration table with respect to the sheet stored in the selected paper feed stage is registered.

Figure 19:
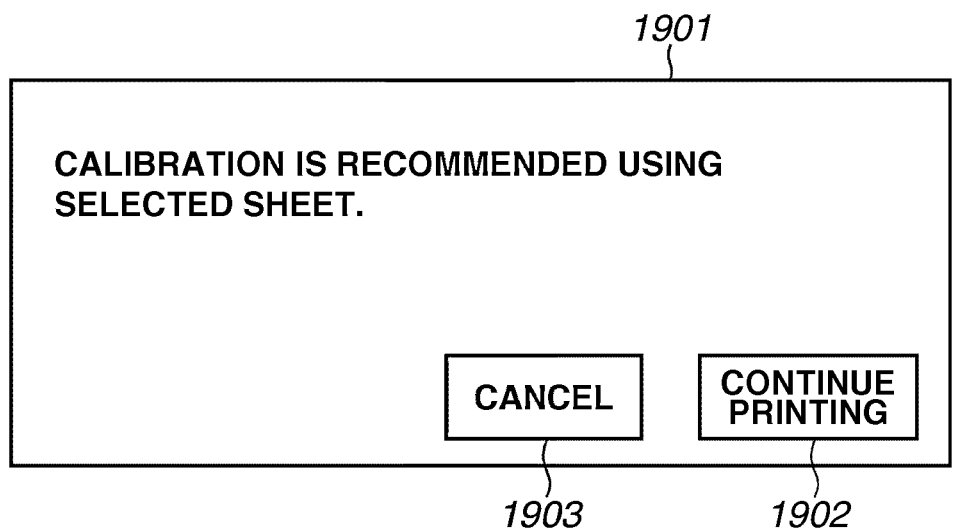
FIG. 19 illustrates an example of a screen recommending calibration to be performed.

If the CPU 1201 determines that the target value C is registered (YES in step S1605), the processing proceeds to step S1606. In step S1606, the CPU 1201 displays on the display 1209 a calibration recommendation screen 1901 as illustrated in FIG. 19. The calibration recommendation screen 1901 is a screen for recommending the user to generate, using the registered target value, the mixed color calibration table with respect to the sheet selected on the recommended paper feed stage screen 1406. Referring to FIG. 19, the calibration recommendation screen 1901 includes a print continue button 1902 for continuing printing without regenerating the calibration table, and a cancel button 1903 for cancelling the current process to generate the calibration table.

In step S1607, the CPU 1201 determines whether the user has pressed the print continue button 1902 or the cancel button 1903. If the user has pressed the cancel button 1903 (NO in step S1607), the CPU 1201 ends all printing processes. If the user has pressed the print continue button 1902 (YES in step S1607), the processing proceeds to step S608. In step S608, the CPU 1201 generates and transmits to the MFP 101 the print data, and the printing processing ends. The CPU 1201 may then display on the display 1209 a display form for prompting the user to perform the necessary process for generating the mixed calibration table.

Figure 20:
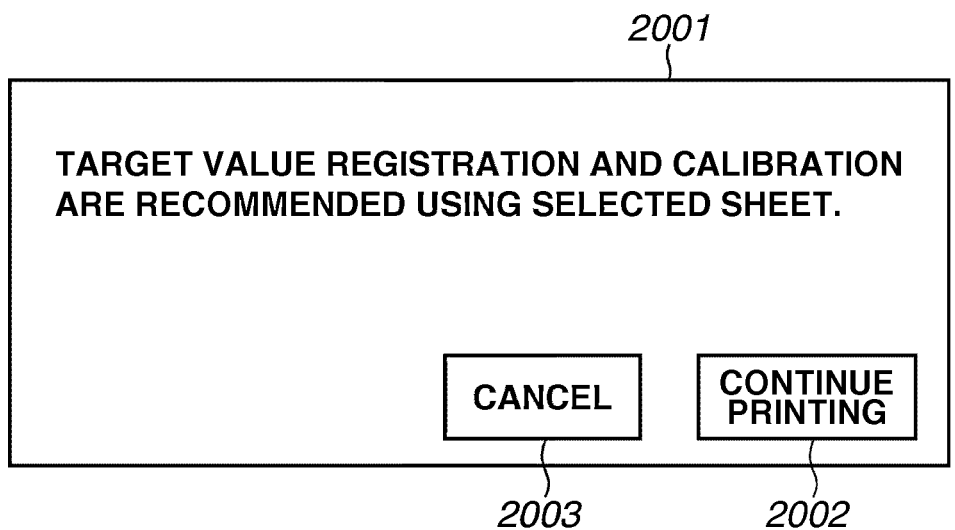
FIG. 20 illustrates an example of a screen recommending registration of a target value.

If the CPU 1201 determines that the target value C is not registered (NO in step S1605), the processing proceeds to step S1608. In step S1608, the CPU 1201 displays on the display 1209 a target value registration recommendation screen 2001 as illustrated in FIG. 20.

The target value registration recommendation screen 2001 is a screen for recommending registration of the target value C used in generating the calibration table with respect to the sheet selected on the recommended paper feed stage screen 1406. Referring to FIG. 20, the target value registration recommendation screen 2001 includes a print continue button 2002 for continuing printing without registering the target value, and a cancel button 2003 for cancelling the current process to register the target value. In step S1609, the CPU 1201 determines whether the user has pressed the print continue button 2002 or the cancel button 2003. If the user has pressed the cancel button 2003 (NO in step S1609), the CPU 1201 ends all printing processes. The CPU 1201 may then display on the display 1209 a display form prompting the user to perform the necessary process for registering the target value.

If the user has pressed the print continue button 2002 (YES in step S1609), the processing proceeds to step S608. In step S608, the CPU 1201 generates and transmits to the MFP 101 the print data, and the printing process ends.

As described above, according to the present exemplary embodiment, the following results are achieved in addition to those according to the first exemplary embodiment.

According to the present exemplary embodiment, the period in which the correction performed using the generated calibration table is valid is set and displayed on the screen. The information for easily determining whether to generate the calibration table with respect to the sheet instructed to be printed on can thus be provided to the user. Further, if the valid period for correction performed using the calibration table has expired, or the user has instructed printing on the sheet of which the target value is not registered, the user can be prompted to generate the calibration table or register the target value. As a result, the user can be guided on the process to be performed.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-143138 filed Jun. 26, 2012, which is hereby incorporated by reference herein in its entirety.

What is claimed is:

1. An information processing apparatus connectable to an image processing apparatus that performs printing using a sheet stored in a paper feed stage and classified as a paper type on which a calibration table has been generated, the information processing apparatus comprising:
- an acquisition unit configured to acquire from the image processing apparatus, information on a type of sheet used when performing calibration and the paper feed stage;
- a receiving unit configured to receive an instruction to perform printing; and
- a notification unit configured to refer to the information on the paper feed stage acquired by the acquisition unit, and notify, in a case where the sheet classified as the paper type on which the calibration table has been generated is not stored in a first paper feed stage instructed to be used for printing when the receiving unit has received an instruction to perform printing, of a second paper feed stage that stores a different type of sheet from the type of sheet stored in the first paper feed stage,
- wherein, in a case where the receiving unit receives an instruction to perform printing, the notification unit performs notification only when prioritization of image quality is instructed in performing the printing.

2. The information processing apparatus according to claim 1, wherein the paper feed stage to be used in performing printing is changed from the first paper feed stage designated when the receiving unit has received an instruction to perform printing to the second paper feed stage notified by the notification unit.

3. The information processing apparatus according to claim 1, wherein the second paper feed stage stores a sheet classified as the paper type on which the calibration table has been generated.

4. The information processing apparatus according to claim 1, wherein a difference between a value indicating characteristics of the paper type of the sheet stored in the second paper feed stage and a value indicating characteristics of the paper type of the sheet on which the calibration table has been generated is smaller than or equal to a threshold value.

5. The information processing apparatus according to claim 1, wherein the information acquired by the acquisition unit at least includes information indicating paper feed stages included in the image processing apparatus, paper types of sheets stored in the paper feed stages, and whether a calibration table has been generated with respect to the stored sheet, and whether a target value to be used in generating a calibration table with respect to the sheet is set.

6. The information processing apparatus according to claim 1, further comprising a setting unit configured to set, in a case where printing is to be performed using a sheet classified as the paper type on which the calibration table has been generated, a correction valid period that is a period in which correction performed using the calibration table is valid.

7. The information processing apparatus according to claim 1, wherein the information acquired by the acquisition unit at least includes information indicating paper feed stages included in the image processing apparatus, the paper type of the sheet stored in the paper feed stage, and whether a calibration table has been generated with respect to the paper type of the stored sheet, whether a target value to be used in generating the calibration table with respect to the paper type is set, and a time at which the calibration table has been generated with respect to the paper type.

8. The information processing apparatus according to claim 6, wherein, in a case where an elapsed time from when the calibration table has been generated with respect to the paper type of the sheet stored in the second paper feed stage has exceeded a correction valid period set by the setting unit, generation of a calibration table with respect to the paper type of the sheet stored in the second paper feed stage is prompted.

9. The information processing apparatus according to claim 1, wherein, in a case where printing is to be performed using a paper feed stage other than the second paper feed stage, and a target value used in generating a calibration table with respect to a paper type of a sheet stored in the paper feed stage is not set, setting of the target value is prompted, and in a case where printing is to be performed using a paper feed stage other than the second paper feed stage, and a target value used in generating a calibration table with respect to a paper type of a sheet stored in the paper feed stage is set, generation of a calibration table is prompted.

10. The information processing apparatus according to claim 1, wherein the information acquired by the acquisition unit is displayed on a display unit.

11. An information processing method in an information processing apparatus connectable to an image processing apparatus that performs printing using a sheet stored in a paper feed stage and classified as a paper type on which a calibration table has been generated, the information processing method comprising:
- acquiring from the image processing apparatus, information on a type of sheet used when performing calibration and the paper feed stage;
- receiving an instruction to perform printing;
- referring to the acquired information on the paper feed stage; and
- notifying, in a case where the sheet classified as a paper type on which a calibration table has been generated is not stored in a first paper feed stage instructed to be used for printing when the receiving unit has received the instruction to perform printing, of a second paper feed stage that stores a different type of sheet from that in the first paper feed stage wherein, in a case where the receiving an instruction to perform printing, notifying only when prioritization of image quality is instructed in performing the printing,
- wherein, in a case where the receiving step receives an instruction to perform printing, the notifying step performs notification only when prioritization of image quality is instructed in performing the printing.

12. A non-transitory computer-readable storage medium storing a program for causing a computer to perform the method according to claim 11.

* * * * *